United States Patent Office 2,871,237
Patented Jan. 27, 1959

2,871,237

2-IMINO-3-SUBSTITUTED-1,3,4,6H-THIADIAZINES AND METHODS FOR THEIR PREPARATION

James T. Gregory, Akron, Ohio, assignor to The B. F. Goodrich Company, New York, N. Y., a corporation of New York No Drawing. Application September 22, 1955
Serial No. 536,026

9 Claims. (Cl. 260—243)

This invention relates to 2-imino-3-substituted-1,3,4,6H-thiadiazines and to methods for their preparation and more particularly pertains to compounds having the generic structure

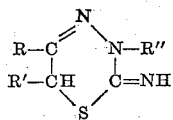

in which R and R' each represents or is selected from the class consisting of hydrogen and hydrocarbon groups and R'' is selected from the class consisting of alkyl, phenyl, halophenyl, nitrophenyl and alkyl substituted phenyl groups, and to methods for preparing the compounds by reacting alpha-thiocyano-carbonyl compounds with an aryl hydrazine.

An object of the invention is the provision of new chemical compounds of the type described. Another object is a method for preparing the above compounds by a unique ring closure reaction. Numerous other objects will be apparent from the detailed disclosure which describes a preferred embodiment of the invention.

The compounds of this invention are slow cure accelerators for rubber. When the imino thiadiazines of this invention are added to a rubber composition at a concentration of about 1 part of imino thiadiazine per 100 parts of rubber, scorch time is increased, resistance to aging at 212° F. and flex resistance were improved slightly. The scorch time was 13.5 minutes as compared to 6.2 minutes for mercaptobenzothiazole and 10.1 minutes for Santocure. The cure rate ($\Delta M/\Delta T$) is in the neighborhood of 1.5 as compared to 12 for mercaptobenzothiazole and 20 for Santocure.

The alpha-thiocyano carbonyl compounds which can be employed in the reaction have the generic formula

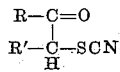

wherein R and R' have the same designation as above. These include the alpha-thiocyano ketones and aldehydes. Specific examples of the alpha-thiocyano compounds which are suitable include alpha-thiocyano-acetaldehyde, alpha-thiocyano-priopionaldehyde, alpha-thiocyano - butyraldehydes, alpha - thiocyano - valeraldehydes, 2-phenyl-2-thiocyano-acetaldehyde, 2-naphthyl-2-thiocyano-acetaldehyde, 2-cyclohexyl-2-thiocyano-acetaldehyde, 1-thiocyanopropanone-2, 1-thiocyano-butanone-2,3-thiocyano-butanone-2, 1-thiocyano-pentanone-2, 2-thiocyano-pentanone-3, 1-thiocyano-hexanone-2, 2-thiocyano-hexanone-3, 3-thiocyano-hexanone-2, 1-thiocyano-heptanone-2, 2-thiocyano-heptanone-3, 3-thiocyano-heptanone-4, 4-thiocyano-heptanone-3, 1-thiocyano-3-phenyl acetone, 1-thiocyano-3-phenyl-butanone-2, 1-thiocyano-4-phenyl-butanone-2, 1-thiocyano-3-phenyl-pentanone-2, 1-thiocyano-4-phenyl-pentanone-2, 2-thiocyano-5 - phenyl-pentanone-3, 2-thiocyano-4-phenyl-butanone-3, 1-thiocyano-2-oxo-1, 2-diphenyl ethane, 1-thiocyano-3-naphthyl acetone, 1-thiocyano-4-naphthyl butanone-2, 1-thiocyano-5-naphthyl pentanone-2, 1-thiocyano-3-cyclohexyl acetone, 1-thiocyano-4-cyclohexyl butanone-2, 2-thiocyano-5-cyclhexyl pentanone-3, 3-thiocyano-5-cyclohexyl hexanone-4, 1-thiocyano-4-cyclohexyl heptanone-2, 2-thiocyano-4-cyclohexyl heptanone-3.

The aryl hydrazines which are satisfactory reactants include phenyl hydrazine, the halogenated phenyl hydrazines, such as p-bromo phenyl hydrazine, p-chloro phenyl hydrazine, p-fluoro phenyl hydrazine, o-chloro phenyl hydrazine, o-, m- and p-methyl phenyl hydrazines, o-, m- and p-ethyl phenyl hydrazines, 2,6-dimethyl phenyl hydrazine, 2,4-dimethyl phenyl hydrazine, o-, m- and p-nitrophenyl hydrazine and other alkyl, halogen or nitro ring substituted aryl hydrazines.

The alkyl hydrazines include methyl hydrazine, ethyl hydrazine, propyl hydrazine, butyl hydrazine, pentyl hydrazine and hexyl hydrazine.

The method of preparing the 2-imino-3-substituted thiadiazines of this invention is to react a carbonyl compound having a thiocyano group in a position alpha to the carbonyl group with a hydrazine of the type described under acid conditions in an inert diluent and at a temperature ranging from room temperature to the reflux temperature of the diluent, which may be as high as 200° C. or higher.

The preferred procedure is to dissolve an aryl hydrazine and a relatively strong acid, or an acid salt of an aryl hydrazine, in an inert diluent such as a mixture of water and ethanol, thereafter add the alpha-thiocyano carbonyl compound and elevate the temperature of the reaction mixture to reflux the diluent.

The proportion of aryl hydrazine to the alpha-thiocyano carbonyl reactant should be equimolar for complete reaction although smaller or greater quantities of each can be employed. The proportion of strong acid based on the aryl hydrazine can vary quite widely, so that as little as 0.1 mole or as much as 2 moles or more of acid to aryl hydrazine can be employed. Mineral acids such as hydrochloric, phosphoric, or sulfuric are preferred. At the low acid concentrations the reaction must be carried on at elevated temperatures to effect ring closure, but at high concentrations of acid the ring closure will be effected at room temperature. If as much as 2 moles of acid are employed for each mole of hydrazine, however, care must be exercised to prevent hydrolysis of the imine group to a carbonyl group which will occur if the temperature is too high. If the acid concentration is below 0.1 mole for each mole of hydrazine hydrazones are formed to the substantially total exclusion of imino thiadiazine.

The following specific examples describe in detail the method of preparing the 2-imino-3-substituted thiadiazines of this invention. In all instances the proportions are used on a weight basis, unless otherwise specified.

Example I

A solution of 27 parts of phenylhydrazine and 8 ml. of concentrated HCl in 200 ml. of water and 100 ml. of ethanol was prepared in a flask equipped with a stirrer, a condenser, a thermometer and a dropping funnel. To this mixture were added 32.25 parts of 3-thiocyano-butanone-2 with stirring. The mixture was heated at reflux temperature (85° C.) for about 2.6 hours, during which time an orange-yellow precipitate formed. The ethanol was removed by distillation and the solid was recovered by filtration. The crude product had a M. P. of 204–206° C., and when recrystallized from glacial acetic acid formed light yellow crystals with a M. P. of 217–219° C. The yield was 98.6% of theory. A sample of the purified material was found to contain the following elemental proportions:

|  | H | C | N | S |
|---|---|---|---|---|
| Calculated for $C_{11}H_{13}N_2S$ | 5.98 | 60.24 | 19.16 | 14.62 |
| Found | 5.83 | 60.19 | 19.03 | 14.61 |

A solution of .0054 gram of the compound per liter of methanol had an $E_{max}$ value of 82 at $267\mu(m\mu)$. On the basis of these results the following structural formula was ascribed to the compound:

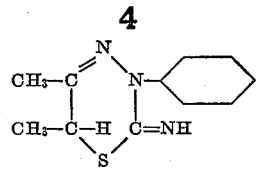

2-imino-3-phenyl-5,6-dimethyl-1,3,4,6H thiadiazine

Examples II–IX

In the table below are listed additional 2-imino-substituted alkyl or aryl thiadiazines that can be prepared by reacting an alpha-thiocyano carbonyl compound with an aryl hydrazine under the conditions described in Example I:

| | Alpha Thiocyano Carbonyl Compound | Aryl Hydrazine | End Product |
|---|---|---|---|
| II | [SCN-CH₂-CHO structure] | phenyl-NHNH₂ | 2-imino-3-phenyl-1,3,4,6H-thiadiazine |
| III | $CH_3(CH_2)_2C=O$ / $CH_3CH_2-CH(SCN)-$ | phenyl-NHNH₂ | 2-imino-3-phenyl-5-isopropyl-6-ethyl-1,3,4,6H-thiadiazine |
| IV | phenyl-CO-CH(SCN)-phenyl | Cl-phenyl-NHNH₂ | 2-imino-3-parachlorophenyl-5,6-diphenyl-1,3,4,6H-thiadiazine |
| V | naphthyl-CO-CH(CH₃)(SCN) | (o-CH₃)phenyl-NHNH₂ | 2-imino-3-orthomethylphenyl-5-naphthyl-6-methyl-1,3,4,6H-thiadiazine |
| VI | $CH_3-CO-CH(SCN)-CH_3$ | $NH_2-NH-$phenyl$-Br$ | 2-imino-3-parabromophenyl-5,6-dimethyl-1,3,4,6H-thiadiazine |
| VII | cyclohexyl-CH₂-CO-CH(SCN)-CH₃ | $NH_2-NH-$phenyl$-C_2H_5$ | 2-imino-3-paraethylphenyl-5-cyclohexylmethyl-6-methyl-1,3,4,6H-thiadiazine |

Table—Continued

| | Alpha Thiocyano Carbonyl Compound | Aryl Hydrazine | End Product |
|---|---|---|---|
| VIII | CH₃—C(=O)—C(SCN)(H)—CH₃ | NH₂—NH—C₆H₃(CH₃)—CH₃ | 2-imino-3(2,4-dimethylphenyl)-5,6-dimethyl-1,3,4,6H-thiadiazine |
| IX | CH₃—C(=O)—C(SCN)(H)—CH₃ | NH₂NH—CH₂CH₃ | 2-imino-3-ethyl-5,6-dimethyl-1,3,4,6H-thiadiazine |

An alternate method of preparing the 2-imino-3-aryl-thiadiazines of this invention is to react an alpha-thiocyano carbonyl compound of the type described with an acid salt of the aryl hydrazine. The diluent need not be a mixture of water and an alcohol. Any inert organic liquid which acts as a solvent for the reactants, such as dioxane, liquid esters, liquid ethers and mixtures of alcohols and ethers. It is preferred to use a diluent which acts as a solvent for the reactants and a non-solvent for the desired end product.

The hydrazines and alpha-thiocyano carbonyl compounds, hereinbefore described, will all react under acid conditions to form 2-imino-3-substituted thiadiazines.

The temperature at which the reaction can be carried out varies from about room temperature to about 200° C. or higher.

The time of reaction under uniform conditions of acidity is related to some degree to the temperature, in that at high temperature ring closure is effected more rapidly than at low temperatures. However, a reaction time of minutes only is needed at very high temperature but an hour or so is needed at temperatures of about 80–90° C.

The pressure at which the reaction takes place can be atmospheric, sub-atmospheric or super-atmospheric. If a low boiling diluent such as ethyl ether is employed it is desirable to run the reaction at elevated pressures to increase the temperature of the reaction medium to the point where ring closure is effected.

Although this invention has been described by specific examples, these are intended for illustrative purposes and are not to be considered as limitations, for it is apparent that equivalent compounds can be employed as reactants to prepare other specific members of the class of 2-imino-3-substituted thiadiazines and the proportions of reactants and reaction conditions can be varied without departing from the spirit and scope of this invention as defined in the appended claims.

I claim:

1. The method of preparing a 2-imino-3-substituted-1,3,4,6H thiadiazine comprising reacting an alpha thiocyano carbonyl compound having the structure $$R-\underset{\underset{H}{|}}{\overset{\overset{O}{\|}}{C}}-\underset{\underset{}{|}}{\overset{\overset{SCN}{|}}{C}}-R'$$

in which R is selected from the class consisting of hydrogen alkyl having from 1 to 5 carbon atoms, lower alkyl, lower alkaryl, phenyl, naphthyl, and cyclohexyl lower alkyl and R' is selected from the class consisting of hydrogen, lower alkyl and phenyl radicals, with a hydrazine having the structure $$R''-NHNH_2$$

in which R'' is selected from the class consisting of alkyl having from 1 to 6 carbon atoms, monocyclic aryl, and ring-substituted monocyclic aryl radicals in which the substituent is selected from the class consisting of chlorine, bromine, fluorine, and lower alkyl radicals, at a temperature from room temperature up to about 200° C. under acid conditions for a time sufficient to cause ring closure and formation of said 2-imino-3-substituted-1,3,4,6H thiadiazines.

2. The method of claim 1 in which the reaction is carried out in the presence of an inert diluent.

3. The method of claim 2 in which the diluent is a mixture of a liquid water-soluble alkanol and water.

4. The method of claim 1 in which the reaction temperature is at least 70° C. and not above about 200° C. and the time of reaction is at least 2 hours.

5. The method of claim 1 in which the hydrazine is phenyl hydrazine.

6. A method of preparing 2-imino-3-phenyl-5,6-dimethyl-1,3,4,6H thiadiazine comprising reacting $$CH_3-\underset{}{\overset{\overset{O}{\|}}{C}}-\underset{\underset{SCN}{|}}{\overset{\overset{H}{|}}{C}}-CH_3$$

with phenyl hydrazine under acid conditions at a temperature of about 85° C. in the presence of a mixture of water and alcohol for about 2 hours.

7. The method of claim 6 in which acidification of the reaction medium is effected by hydrochloric acid.

8. The method of claim 6 in which the hydrazine is parabromo phenyl hydrazine.

9. The method of claim 6 in which the hydrazine is paramethyl phenyl hydrazine.

References Cited in the file of this patent

Chemical Abstracts, 20:415 [9] [abstract of Bose, Quarterly J. Indian Chem. Soc. 2, pp. 95–114 (1925)].

Bulow and Seidel: Liebig's "Annalen der Chemie," 439:48–58 (1924).

UNITED STATES PATENT OFFICE
Certificate of Correction

Patent No. 2,871,237    January 27, 1959

James T. Gregory

It is hereby certified that error appears in the printed specification of the above numbered patent requiring correction and that the said Letters Patent should read as corrected below.

Columns 3 and 4, under the heading "End Product", the formula of Example V should read as shown below instead of as in the patent:

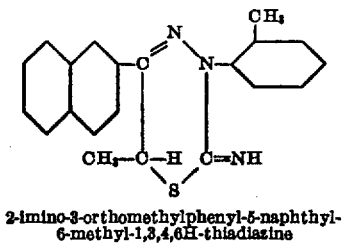

2-imino-3-orthomethylphenyl-5-naphthyl-
6-methyl-1,3,4,6H-thiadiazine

Signed and sealed this 4th day of August 1959.

[SEAL]

Attest:
KARL H. AXLINE,
*Attesting Officer.*

ROBERT C. WATSON,
*Commissioner of Patents.*